May 29, 1928.
A. E. WILSHUSEN
GOVERNOR
Filed Jan. 31, 1927
1,671,756
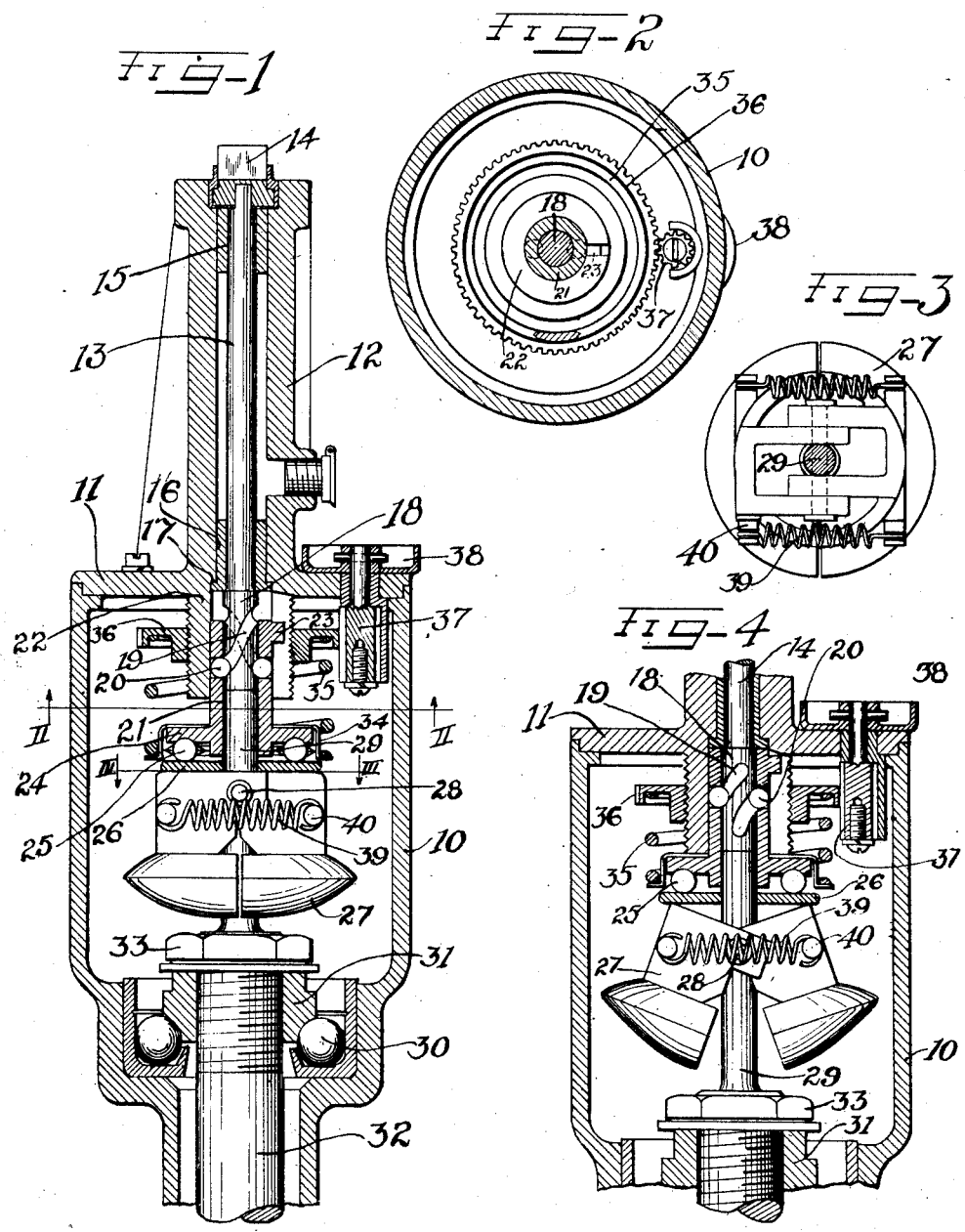
Inventor
August E Wilshusen Patented May 29, 1928.

1,671,756

UNITED STATES PATENT OFFICE.

AUGUST E. WILSHUSEN, OF KOKOMO, INDIANA.

GOVERNOR.

Application filed January 31, 1927. Serial No. 165,015.

This invention relates to centrifugal governors for internal combustion engines, with particular reference to a high speed cut-off type of governor which will not interfere with full power development at speeds lower than that of cut-off.

It is accordingly an object of this invention to so modify the action of a governor of the type specified as to reduce or delay the normally gradually increasing governor movement as the engine speeds up in order to permit the development of the maximum power of the engine at speeds near to but below the governed speed. In an Otto cycle engine the most practical governing system is to use some form of valve in the intake manifold and this valve is intended to be externally controlled by the apparatus of the present invention.

It is also an object of this invention to provide a centrifugal type governor mechanism wherein pivoted weights are rotated, the centrifugal force generated acting to swing the weights out more or less against the resistance of an adjustable spring. A coiled spring is provided normally acting to draw the weights together but so connected to the weights that when the weights swing out into the operating position the spring axis moves toward the pivot axis of the weights, decreasing the spring leverage until with the weights in fully extended position the spring axis aligns with the pivot axis so that the spring force is neutralized and the weights become sensitive to small speed variations. The result of this structure is to normally hold the weights in, leaving the manifold fully open until the speed reaches the desired cut-off when a slight drop in speed allows the governor to release completely thus permitting the development of full power at speeds close to the cut-off speed.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary vertical section through a governor mechanism embodying the features of this invention.

Figure 2 is a section on the line II—II of Figure 1.

Figure 3 is a section on the line III—III of Figure 1.

Figure 4 is a fragmentary section similar to Figure 1 showing the governor weights in extended position.

As shown on the drawings:

A governor casing 10 is provided with a cap 11 having a central extension 12 containing a throttle operating shaft 13 the free end of which has a suitable coupling 14 for engaging and operating the throttle proper. The shaft 13 is journaled in upper and lower bushings 15 and 16 the lower bushing 16 being provided with a shoulder 17 and the shaft also having a shoulder formed by a shaft enlargement 18 the shoulder bearing against the bushing to prevent vertical displacement of the shaft. The shaft enlargement 18 is provided with oppositely disposed spiral grooves 19 to partly receive balls 20 carried by a sleeve 21 limited to vertical non-rotative movement within the boss 22 by an outstanding key 23. The sleeve 21 carries a flange 24 which forms the upper race of a ball thrust bearing 25 the lower race 26 of which is acted upon by the outer corners of a pair of centrifugal weights 27 pivoted at 28 to a driving shaft 29 which is journaled at the bottom of the casing in an angular contact ball bearing 30 the inner race 31 of which is locked to an enlarged portion 32 of the shaft by the nut 33.

A spring seat 34 is mounted above the flange 24 which seat is formed as an inverted shallow cup with an outstanding rim on which the lower end of a coil spring 35 rests, the upper end of the spring engaging an adjustable rest 36 screwed onto the outside of the boss 22 and having gear teeth on its periphery adapted to be engaged by a pinion 37 journaled in the casing cover and externally operable by means of the member 38 secured thereto.

The center of gravity of the governor weights 27 is positioned at a considerable distance from the pivot 28 and a light coil spring 39 connects the pins 40 on the weights 27 at an appreciable distance below the axis of the pivot 28 when the weights hug the shaft, so that the weights are held in this position by the spring until the centrifugal force of the weights reaches a magnitude sufficient to overcome the spring force plus the resistance of the normal governor spring 35. As the weights swing out the pins 40 are carried up relative to the pivot 28 so that the axis of the coil spring 39 moves towards the axis of the pivot thus decreasing the lever arm of the spring 39 and allowing freer movement of the weights. As the weights approach their limiting outward position the spring 39 is increasingly neutralized because the leverage thereof decreases, so that the sensitiveness of the governor weights to slight changes in speed increases to a maximum at the position of the cut-off and below this limiting speed the governor is held back to increase the throttle opening at lower speeds.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a governor of the class described a shaft, a pair of weights oppositely disposed about said shaft, a common pivot for said weights located at an appreciable distance from the center of gravity thereof whereby the weights are movable by centrifugal force, a regulating spring opposing the outward movement of said weights, and a spring connecting said weights at points adapted to give a leverage about the pivot, said spring being so disposed that the leverage thereof decreases as the weights move under the influence of centrifugal force whereby the sensitiveness of the governor is increased with increases in the centrifugal force acting on said weights.

2. In a governor, a rotating shaft, centrifugal governor weights having a common pivot on said shaft, a regulating spring opposing the outward movement of said weights, and a spring connecting said weights and normally restraining said weights from swinging out, said spring being so positioned on the weights as to be rendered inoperative by the outward swing of said weights decreasing the leverage of said spring relative to the pivot of said weights.

3. In a centrifugal governor including the weights and regulating spring thereof, a spring adapted to normally act to partially restrain the weights from swinging out, said spring being attached to said weights at points thereon that will move into a plane containing the pivot of the weights when said weights swing out at the cut-off speed, whereby the spring is rendered inoperative at the cut-off speed.

4. In a centrifugal governor including the weights and regulating spring thereof, yielding means normally resisting the opening movement of said weights at speeds below the cut-off, said means being so positioned with regard to the weights that the outward movement of said weights decreases the effectiveness of said yielding means.

5. In a governor, weights oppositely disposed and having a common pivot, means resisting the normal opening movement of said weights, pins on said weights so positioned as to move upwardly into line with the pivot when said weights swing outwardly, and a spring connecting said pins.

In testimony whereof I have hereunto subscribed my name at Kokomo, Howard County, Indiana.

AUGUST E. WILSHUSEN.